US010108802B2

(12) United States Patent
Lu et al.

(10) Patent No.: US 10,108,802 B2
(45) Date of Patent: Oct. 23, 2018

(54) STATIC PROGRAM ANALYSIS METHOD FOR DETECTING SECURITY BUGS IN PROGRAMS THAT RELY ON CODE ACCESS CONTROL

(71) Applicant: Oracle International Corporation, Redwood Shores, CA (US)

(72) Inventors: Yi Lu, Brisbane (AU); Raghavendra Kagalavadi Ramesh, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 557 days.

(21) Appl. No.: 14/611,119

(22) Filed: Jan. 30, 2015

(65) Prior Publication Data

US 2016/0224793 A1    Aug. 4, 2016

(51) Int. Cl.
G06F 21/57    (2013.01)
G06F 11/36    (2006.01)

(52) U.S. Cl.
CPC ........ *G06F 21/577* (2013.01); *G06F 11/3604* (2013.01); *G06F 2221/033* (2013.01)

(58) Field of Classification Search
None
See application file for complete search history.

(56) References Cited

U.S. PATENT DOCUMENTS

| 9,317,682 | B1* | 4/2016 | Kopylov | ................ G06F 21/53 |
| 9,378,377 | B1* | 6/2016 | Kuan | ................... G06F 21/577 |
| 2012/0131670 | A1* | 5/2012 | Artzi | ...................... G06F 21/00 726/22 |

OTHER PUBLICATIONS

Marco Pistoia et al., "Beyond Stack Inspection: A Unified Access-Control and Information-Flow Security Model" May 20, 2007 (15 pages).
Martin Abadi et al., "Access Control based on Execution History" Feb. 6, 2003 (15 pages).
Anindya Banerjee et al., "Stack-based Access Control and Secure Information Flow" Mar. 1, 2005 (47 pages).

\* cited by examiner

*Primary Examiner* — Azizul Choudhury
(74) *Attorney, Agent, or Firm* — Ferguson Braswell Fraser Kubasta PC

(57) ABSTRACT

A method for using static program analysis for detecting security bugs in application source code including receiving and determining a plurality of variables based on the application source code. The method further includes determining a plurality of information flow relations comprising a source variable and a target variable, determining a confidentiality requirement and a capability for each of the source variables, and determining an integrity requirement and a capability for each of the target variables. The method further includes generating an error report log entry when the capability of the target variable is not greater than and not equal to the confidentiality requirement of the source variable or the capability of the source variable is not greater than and not equal to the integrity requirement of the target variable. The method further includes generating an error report log.

20 Claims, 5 Drawing Sheets

STATIC PROGRAM ANALYSIS METHOD FOR DETECTING SECURITY BUGS IN PROGRAMS THAT RELY ON CODE ACCESS CONTROL

BACKGROUND

Different portions of source code can have different levels of access to sensitive system resources. Some portions of source code may be trusted, and receive a high level of access to sensitive system resources. Other portions of source code may be untrusted, and receive only a low level of access to sensitive system resources. The trusted and untrusted portions of source code may need to communicate with each other, and protections put in place to detect or prevent malicious data from flowing from the untrusted code to the trusted code would help to keep the overall source code secure.

SUMMARY

In general, in one aspect, the invention relates to a method for using static program analysis for detecting security bugs in application source code. The method steps include receiving the application source code, determining a plurality of variables based on the application source code, and determining a plurality of information flow relations comprising a source variable and a target variable using the plurality of variables. The method steps further include determining a confidentiality requirement and a capability for each of the source variables of the plurality of information flow relations and determining an integrity requirement and a capability for each of the target variables of the plurality of information flow relations. The method steps further include generating an error report log entry for each of the plurality of information flow relations, wherein the capability of the target variable is not greater than and not equal to the confidentiality requirement of the source variable or the capability of the source variable is not greater than and not equal to the integrity requirement of the target variable. The method steps further include generating an error report log using the error report log entries, and compiling the application source code into compiled application source code based on the error report log.

In general, in one aspect, the invention relates to a system for using static program analysis for detecting security bugs in application source code. The system includes a computer processor and a memory. The system further includes an information flow analysis module stored in the memory and executing on the computer processor, configured to receive the application source code, determine a plurality of variables using the application source code, and determine a plurality of information flow relations comprising a source variable and a target variable using the plurality of variables. The system further includes an access control analysis module stored in the memory and executing on the processor, configured to determine a confidentiality requirement and a capability for each of the source variables of the plurality of information flow relations and determine an integrity requirement and a capability for each of the target variables of the plurality of information flow relations. The access control analysis module is further configured to generate an error report log entry for each of the plurality of information flow relations wherein the capability of the target variable is not greater than and not equal to the confidentiality requirement of the source variable or the capability of the source variable is not greater than and not equal to the integrity requirement of the target variable and generate an error report log using the error report log entries. The system further includes a compiler configured to compile the application source code into compiled application source code based on the error report log and a data repository storing the application source code, a plurality of policy files, and a plurality of specification files.

In general, in one aspect, the invention relates to a non-transitory computer readable medium comprising computer readable program code embodied therein for causing a computer system to perform a method for using static program analysis for detecting security bugs in application source code. The method steps include receiving the application source code and determining a plurality of variables based on the application source code. The method steps further include determining a plurality of information flow relations comprising a source variable and a target variable using the plurality of variables, determining a confidentiality requirement and a capability for each of the source variables of the plurality of information flow relations, and determining an integrity requirement and a capability for each of the target variables of the plurality of information flow relations. The method steps further include generating an error report log entry for each of the plurality of information flow relations wherein the capability of the target variable is not greater than and not equal to the confidentiality requirement of the source variable or the capability of the source variable is not greater than and not equal to the integrity requirement of the target variable. The method steps further include generating an error report log using the error report log entries, and compiling the application source code into compiled application source code based on the error report log.

Other aspects of the invention will be apparent from the following description and the appended claims.

DETAILED DESCRIPTION

Figure 1:
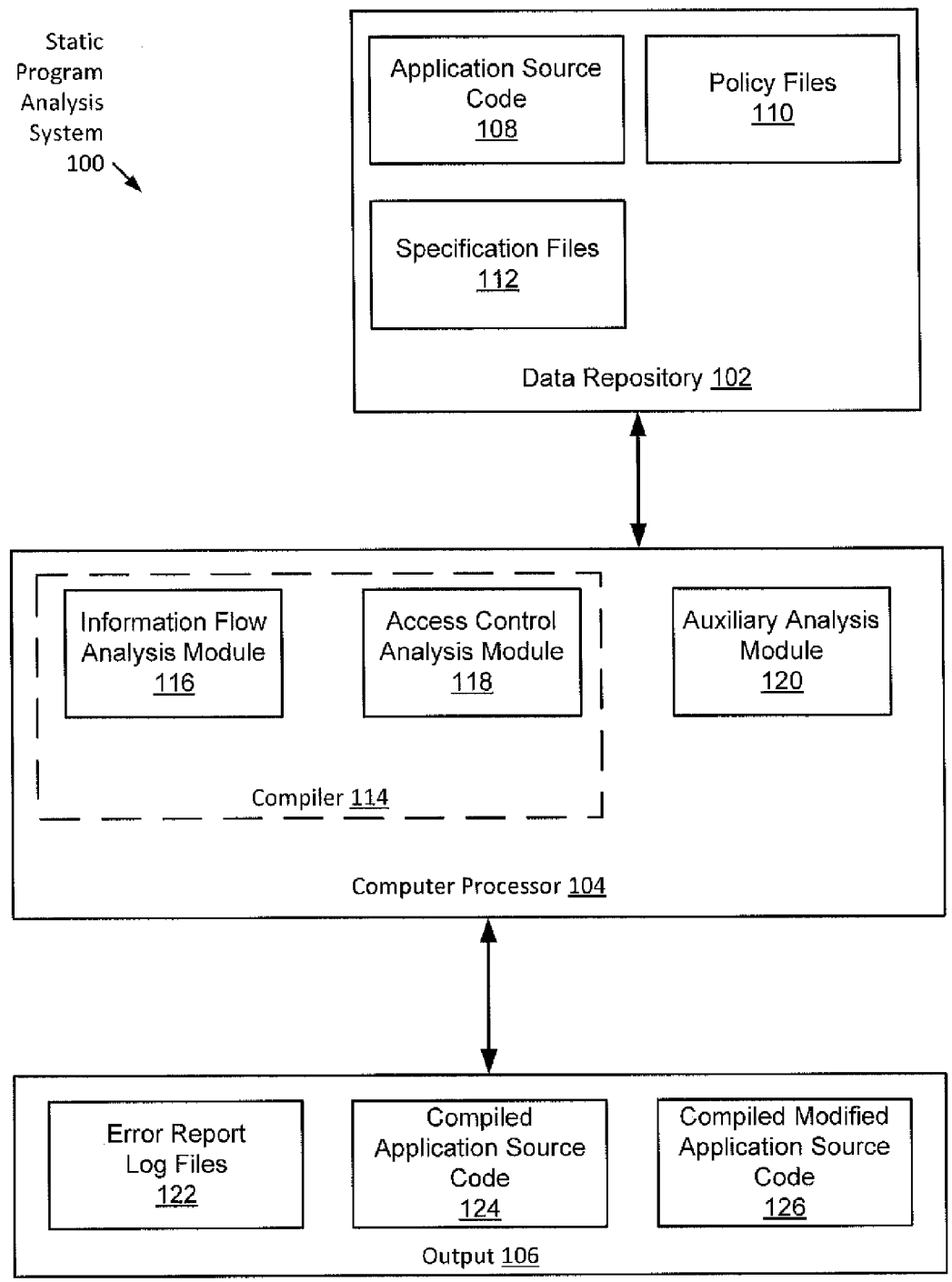
FIG. 1 shows a schematic diagram system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

FIG. 1 shows a diagram of a static program analysis system (100) in accordance with one or more embodiments of the invention. As shown in FIG. 1, the static program analysis system (100) includes a data repository (102), a computer processor (104), and output (106). In one or more embodiments, the data repository (102) and computer processor (104) are communicatively coupled via a network (not shown) (e.g., a local area network (LAN), a wide area network (WAN) such as the Internet, mobile network, or any other type of network). Further, in one or more embodiments, the data repository (102) and computer processor (104) may take the form of a specialized computer system of the type found and described in relation to FIG. 4.

In one or more embodiments, the data repository (102) includes application source code (108), one or more policy files (110), and one or more specification files (112), each of which is described in further detail below. In one or more embodiments, the computer processor (104) includes a compiler (114), and the compiler includes an information flow analysis module (116) and an access control analysis module (118). In one or more embodiments, the computer processor (104) also includes an auxiliary analysis module (120). The computer processor (104), compiler (114), information flow analysis module (116), access control analysis module (118), and auxiliary analysis module (120) are each described in further detail below. In one or more embodiments, the output (106) includes one or more error report log files (122), compiled application source code (124), and compiled modified application source code (126), each of which is described in further detail below.

In one or more embodiments, data repository (102) is any type of storage unit and/or device (e.g., a file system, database, tape storage, external hard drive, collection of tables, or any other storage mechanism) for storing data. Further, the data repository (102) may include multiple different storage units and/or devices, including multiple different storage units and/or devices on separate computer systems such as the specialized computer systems described in connection with FIG. 4. In one or more embodiments of the invention, the data repository (102) includes functionality to store and retrieve application source code (108), policy files (110), and specification files (112). In one or more embodiments, the data repository (102) includes functionality to send and receive application source code (108), policy files (110), and specification files (112) to and from the computer processor (104).

Figure 3:
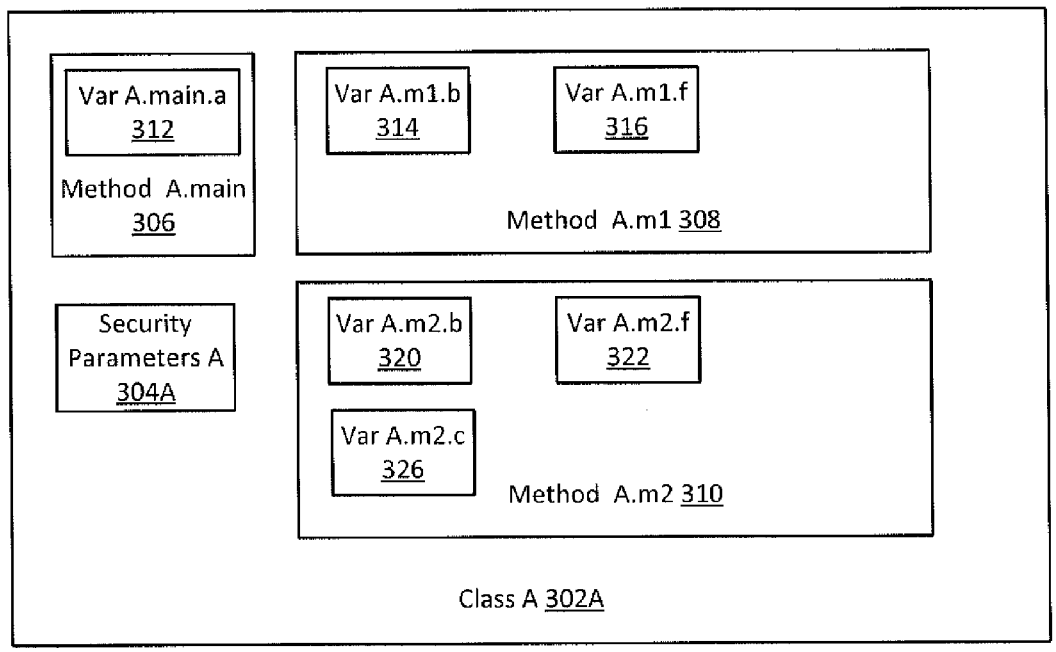
FIGS. 3 and 4 show schematic diagram systems in accordance with one or more embodiments of the invention.
Figure 3:
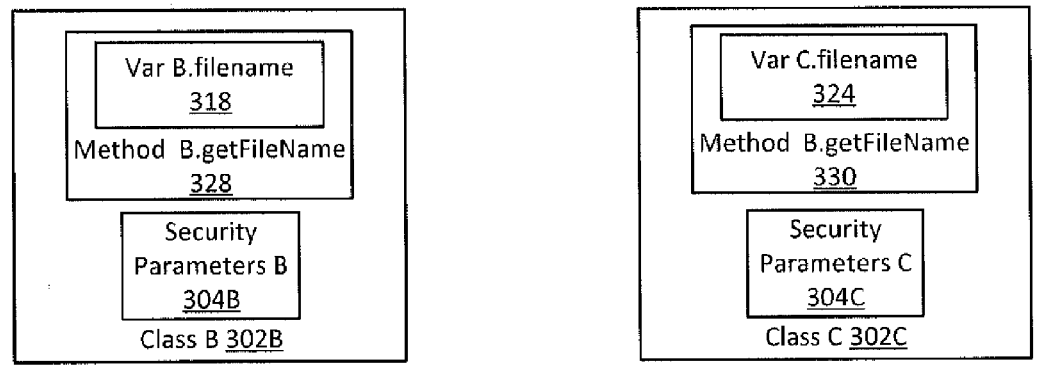

In one or more embodiments, the application source code (108) is a collection of computer instructions written using a human-readable computer language (e.g., Java, C, C++, etc.) for transformation by a compiler into object or machine code understood by a computer for execution at a later time. (Java is a registered trademark of Oracle Corporation, Redwood City, Calif., USA.) In one or more embodiments, the application source code (108) includes one or more classes. A class is one or more lines within the application source code (108) that may be used for creating objects in an object oriented programming language. Further, a class may include methods, variables, and private members. For example, Class A (302A) in FIG. 3 is a class. In one or more embodiments, the application source code includes one or more methods. A method is a subroutine associated with a class or with an object of a class that forms its interface through which the outside members of the class (i.e., other objects) may access its private members (i.e., variables only directly accessible to methods associated with a class). For example, class B (302B) in FIG. 3 includes the method B.getFileName (328). In one or more embodiments, the application source code includes one or more variables. A variable is a storage location paired with an associated symbolic name which contains some known or unknown quantity or information. C.filename (324) in FIG. 3 is an example variable.

In one or more embodiments, the application source code (108) may include subsets of source code that have different abilities to access sensitive system resources. For example, well-known or system-defined classes may have a high ability to access sensitive system resources, while user-defined classes or classes associated with an Internet plug-in may represent more of a security risk and therefore have a corresponding lower ability to access sensitive system resources. If the lower-ability portions of application source code (108) somehow influence or pass malicious data to higher-ability portions of application source code (108), a security vulnerability may be present. A user may improve one or more portions of application source code (108) by searching for such security vulnerabilities and modifying the application source code (108) into modified application source code before compiling such that the modified application source code has removed or otherwise accounted for or addressed such security vulnerabilities.

In one or more embodiments, the policy files (110) are data structures that include one or more mappings from each method or class in the application source code (108) to a capability. In one or more embodiments, a capability is an expression of the permissions granted and held by the code. A capability may be any expression of the permissions that a portion of application source code has with respect to accessing potentially sensitive system resources. A capability may be expressed in numeric terms (e.g., 0, 1, 2, 3, 4, etc.), in relative terms (e.g., high, low, medium, etc.), or in terms of specific system functionality that a portion of application source code has access to (e.g., AllPermission, 0, Read, Write, ReadWrite, etc.). In one or more embodiments, the policy files (110) include one or more mappings of permissions to code from specified code sources. For example, application source code (108) from a designer of the source code environment may receive a higher capability. In one or more embodiments, the policy files (110) are provided by the user and/or author of the application source code (108). For example, prior to compilation or static program analysis, a user could supply one or more policy files (110) for the application source code (108).

In one or more embodiments, each method and variable associated with a class has a capability derived from the class. For example, each method and variable in class FileOutputStream could have a capability of "AllPermission." In this example, each method and variable in class FileOutputStream has the highest level of capability in the system. In another example, each method in user-defined class A could have a capability of "0." In one or more embodiments, each class has a security parameters object (e.g., security parameters A (304A), security parameters B (304B), and security parameters C (304C) as discussed below in connection with FIG. 3) created and/or maintained that stores the capability for each class and for each method and variable associated with the class. In one or more embodiments, each security parameters object is included in the application source code (108) the policy files (110), and/or the specification files (112). In one or more embodiments, each security parameters object is created using the application source code (108), the policy files (110), and/or the specification files (112). In one or more embodiments, each security parameters object is stored in the data repository (102).

In one or more embodiments, the specification files (112) are data structures that include one or more mappings for each method or class in the application source code (108) to an integrity requirement and a confidentiality requirement. In one or more embodiments, the integrity requirement and the confidentiality requirement correspond to permissions required to access the method in the application source code (108). For example, the specification files (112) may be used to protect security-sensitive code by specifying a higher level of permissions required to access the code. In one or more embodiments, an integrity requirement is a requirement that the source of information has sufficient privilege to send the information to the intended target. For example, a target with a high integrity requirement may receive information from a source with high capability. In one or more embodiments, a confidentiality requirement is a requirement of a source of information that the source has sufficient privilege to send the information to the target. An integrity requirement and a confidentiality requirement may be expressed in numeric terms (e.g., 0, 1, 2, 3, 4, etc.), in relative terms (e.g., high, low, medium, etc.), or in terms of specific functionality that a piece of code has access to (e.g., AllPermission, 0, Read, Write, ReadWrite, etc.).

In one or more embodiments, each method has its own integrity requirement and confidentiality requirement and each variable within the scope of a method has an integrity requirement and a confidentiality requirement derived from the method. For example, the method A.m1 (308) may have an integrity requirement and a confidentiality requirement of "0," and variables A.m1.b (314) and A.m1.f (316), which are within the scope of method A.m1 (308), may have an integrity requirement and a confidentiality requirement of "0." Further, in this example, the method A.m2 (31) may have an integrity requirement and a confidentiality requirement of "1," and variables A.m2.b (320), A.m2.f (322), and a.m2.c (326) which are within the scope of method A.m2 (310), may have an integrity requirement and a confidentiality requirement of "0." In one or more embodiments, each method and variable associated with a class has an integrity requirement and a confidentiality requirement derived from a class. For example, each method and variable in class FileOutputStream could have an integrity requirement and a confidentiality requirement of "0." In this example, the permissions required to access each method and variable in class FileOutputStream is the lowest level of permissions available in the system. In one or more embodiments, each class has a security parameters object (e.g., security parameters A (304A), security parameters B (304B), and security parameters C (304C) as discussed below in connection with FIG. 3) created and/or maintained that stores the integrity requirement and confidentiality requirement for each class and for each method and variable associated with the class.

In one or more embodiments, each confidentiality requirement is capable of being compared to the capability. For example, the access control analysis module (118) may determine if a confidentiality requirement is less than or equal to a capability. In one or more embodiments of the invention, the integrity requirement is capable of being compared to the capability. For example, the access control analysis module (118) may determine if an integrity requirement is less than or equal to a capability.

In one or more embodiments, the computer processor (104) includes a compiler (114), an information flow analysis module (116), an access control analysis module (118), and an auxiliary analysis module (120). The computer processor (104) may execute on one or more computing systems (e.g., servers, such as the specialized computer systems described in connection with FIG. 4) in accordance with one or more embodiments of the invention.

In one or more embodiments of the invention, the compiler (114) is a computer system, group of computer systems, process, or group of processes configured to compile application source code (108) into compiled application source code (124). For example, the compiler (114) may be configured to compile one or more .Java files into one or more Java .class files containing platform-neutral Java bytecode. The compiler may take the form of one or more specialized computers as discussed in connection with FIG. 4. The compiler (114) may also be configured to compile the application source code (108) based on a determination that no error report log entries are generated or that an error report log file (122) is empty. In one or more embodiments, the compiler (114) may be further configured to modify the application source code (108) into modified application source code based on the error report log file (122) and compile the modified application source code into compiled modified application source code (126). In one or more embodiments, the compiler (114) includes an information flow analysis module (116) and an access control analysis module (118), which may be implemented on the same or different specialized computers.

In one or more embodiments, the information flow analysis module (116) is a computer system, group of computer systems, software process, or group of software processes configured to receive application source code (108) and determine a plurality of variables using application source code. In one or more embodiments, the information flow analysis module (116) is configured to determine a plurality of information flow relations comprising a source variable and a target variable using a plurality of variables.

In one or more embodiments, an information flow relation includes a source variable and a target variable, and is an indication that information may flow from the source variable to the target variable. For example, application source code (108) containing an assignment of variable X in method A of class Q to variable Y in method B of class R may correspond to an information flow relation with a source of variable X and a target of variable Y. In another example, application source code (108) containing an assignment of variable X in method A of class Q to variable Y in method B of class R and an assignment of variable Y in method B of class R to variable Z in method C of class S may correspond to three information flow relations reflecting the transitive properties of assignment—a first information flow relation with a source of variable X and a target of variable Y, a second information flow relation with a source of variable Y and a target of variable Z, and a third information flow relation with a source variable of X and a target variable of Z. In this way, multiple possible downstream recipients of information flowing from each source variable may be expressed.

In one or more embodiments, information flow relations may be the result explicit flow of information, implicit flow of information, or both. An explicit information flow relation reflects a non-branching path in application source code (108), such that information flows from the source variable to the target variable. An implicit information flow relation reflects a branching path in application source code (108), such that information may flow from the source variable to the target variable depending on the execution of the application source code (108) at runtime. For example, in a portion of application source code (108) containing an assignment from variable X to variable Y if a first condition is true and an assignment from variable X to variable Z if the first condition is false, two implicit information flow relations may result—a first information flow relation with a source of variable X and a target of variable Y and a second information flow relation with a source of variable X and a target of variable Z.

In one or more embodiments, the access control analysis module (118) is a computer system, group of computer systems, software process, or group of software processes configured to determine a confidentiality requirement and a capability for each of the source variables of the plurality of information flow relations. In one or more embodiments, the access control analysis module (118) is also configured to determine an integrity requirement and a capability for each of the target variables of the plurality of information flow relations. In one or more embodiments, the access control analysis module is configured to make these determinations using policy files (110) and/or specification files (112).

In one or more embodiments, the access control analysis module (118) is also configured to generate an error report log entry for one or more information flow relations when the capability of the target variable is not greater than and not equal to the confidentiality requirement of the source variable or the capability of the source variable is not greater than and not equal to the integrity requirement of the target variable. In one or more embodiments, the access control analysis module (118) is configured to generate an error report log using the error report log entries.

In one or more embodiments, the access control analysis module (118) is connected to one or more output devices (408) to output the error report log files (122), compiled application source code (124), and/or compiled modified application source code (126) (collectively, output (106)). For example, the access control analysis module (118) may be connected to a display or a printer used to output the error report log files. In one or more embodiments, the access control analysis module (118) is connected to one or more input devices (410). For example, the access control analysis module (118) may be configured to receive policy files (110), specification files (112), or modified application source code via an input device (410).

In one or more embodiments, the auxiliary analysis module (120) is a computer system, group of computer systems, software process, or group of software processes. In one or more embodiments, the auxiliary analysis module (120) is configured to perform one or more actions of the information flow analysis module (116) and/or the access control analysis module (118). For example, the auxiliary analysis module (120) may be configured to determine a plurality of variables using the application source code (108).

In one or more embodiments, the output (106) includes error report log files (122), compiled application source code (124), and/or compiled modified application source code (126). In one or more embodiments, the output (106) may take the form of being presented via the output device (408) described below in connection with FIG. 4.

Figure 2A:
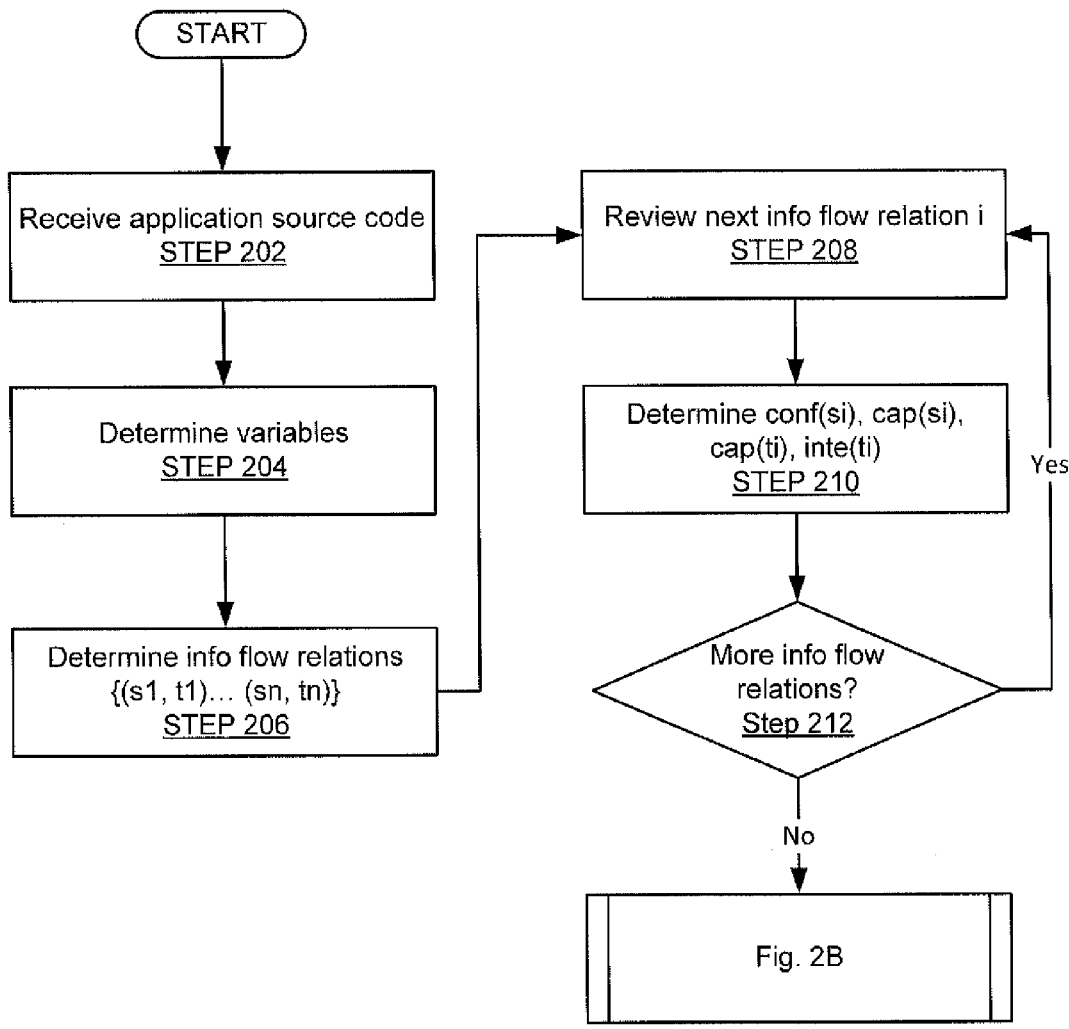
FIGS. 2A and 2B show flowcharts in accordance with one or more embodiments of the invention.
Figure 2B:
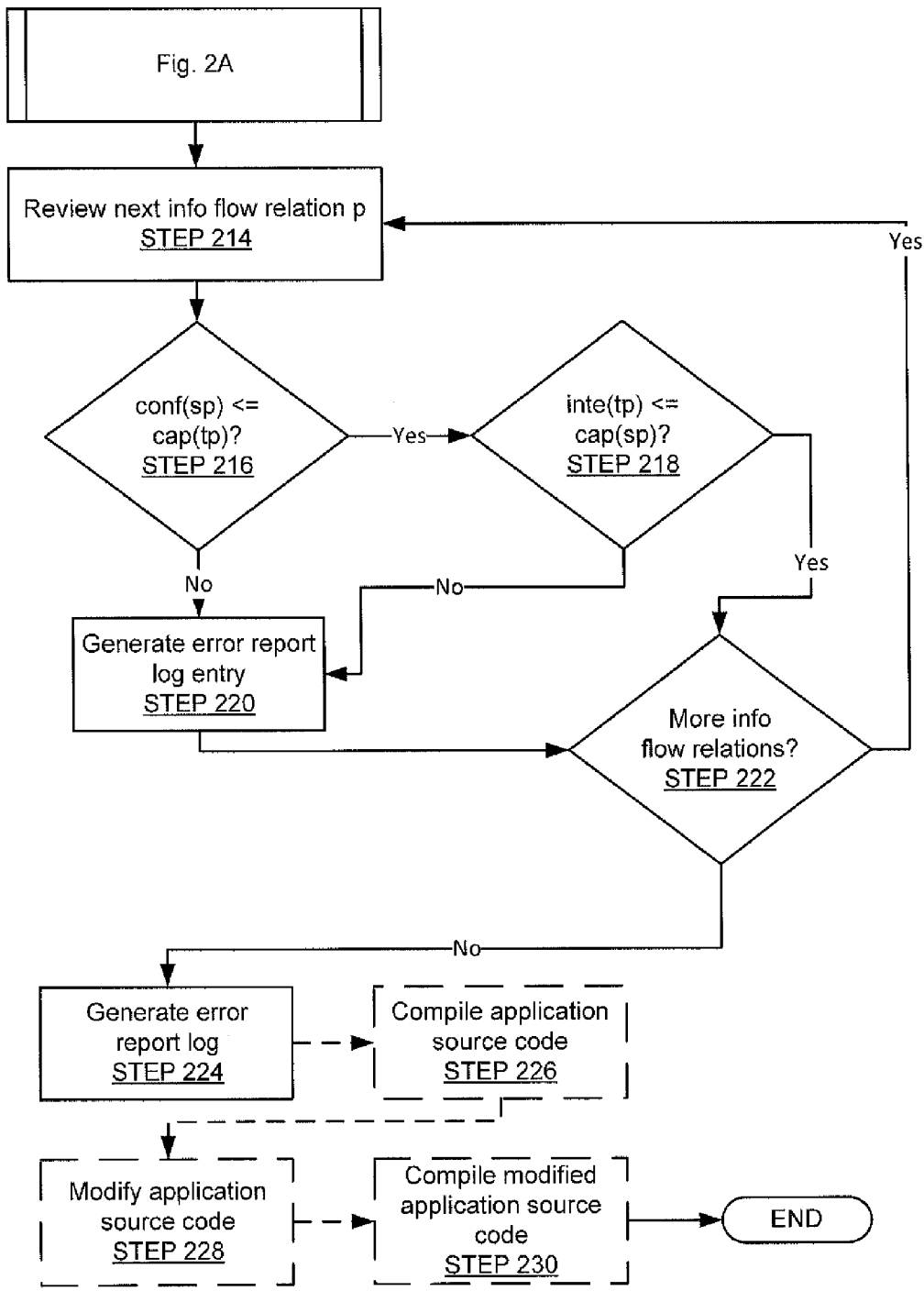

In one or more embodiments, the error report log files (122) are data structures that include a descriptive listing for each information flow relation that fails the determination as performed by the access control analysis module (118) described further in connection with FIG. 2. In one or more embodiments, the error report log files (122) may be human readable and may describe or explain to one or more users specific variables, methods, and/or classes that fail the determinations as performed by the access control analysis module (118). In one or more embodiments, the error report log files (122) are machine readable descriptions of specific variables, methods, and/or classes that fail the determinations as performed by the access control analysis module (118).

In one or more embodiments, the compiled application source code (124) is a collection of object code, byte code, or machine code understood by a computer for execution (e.g., Java bytecode, .exe files, etc.) and compiled from the application source code (108). In one or more embodiments, the compiled application source code (124) is produced by a compiler (114). In one or more embodiments, the compiled modified application source code (126) is a collection of object code, byte code, or machine code understood by a computer for execution (e.g., Java bytecode, .exe files, etc.) and compiled from modified application source code (108).

FIG. 2 shows a flowchart in accordance with one or more embodiments of the invention. In STEP 202, in one or more embodiments, the information flow analysis module receives the application source code. In one or more embodiments, the information flow analysis module receives the application source code from a data repository. For example, a user may select via an input device one or more portions of application source code, which is then received by the information flow analysis module from the data repository. In one or more embodiments, the information flow analysis module receives the application source code from an input device operatively connected to the information flow analysis module. For example, a user may type in one or more sections of application source code via a prompt, and the input application source code may be received by the information flow analysis module. In one or more embodiments, the data repository and the information flow analysis module are located on the same computer or group of computers. In another embodiment, the data repository and the information flow analysis module are located on separate computers and operatively connected by a network. In another embodiment, the information flow analysis module receives the application source code from persistent or volatile memory operatively connected to the information flow analysis module.

In STEP 204, in one or more embodiments, the information flow analysis module determines a plurality of variables using the application source code. In one or more embodiments, the information flow analysis module iterates through the application source code line-by-line and determines the variables present in each line. For example, the information flow analysis module may parse each file within a collection of application source code and determine the variables within each file within the application source code. In this example, the information flow analysis module may determine that a line in the application source code containing an assignment from variable X to variable Y includes the variable X and variable Y. Further in this example, the information flow analysis module may determine that a line in the application source code containing a function call passing variable Z as an argument includes the variable Z.

In one or more embodiments, the information flow analysis module may associate a method and class with each variable. For example, the information flow analysis module may append a method and class name to the name of each variable. In this example, a variable b created in method m1 in class A may be given the name "A.m1.b" by the information flow analysis module. Further in this example, a variable b created in method m2 in class A may be given the name "A.m2.b." In this example, A.m1.b and A.m2.b may therefore be distinguished by their scope.

In STEP 206, in one or more embodiments, the information flow analysis module determines a plurality of information flow relations including a source variable and a target variable using the plurality of variables as determined in STEP 204. In one or more embodiments, the information flow analysis module determines for each variable as determined in STEP 204 the possible variables to which information may flow. For each possible target, in one or more embodiments the information flow analysis module determines an information flow relation using the variable as determined in STEP 204 as the source and the possible variables to which information may flow as a target. The information flow analysis module may determine such an information flow relation even if the flow is indirect or has intermediate variables in between the source and target.

For example, a portion of application source code may contain variables X, Y, and Z (as determined in STEP 204), and information flows from variable X to variable Y and from variable Y to variable Z (e.g., via transitive assignment commands of "y=x" and "z=y"). In this example, the information flow analysis module may start with variable X and create an information flow relation with variable X as the source for each additional variable to which information may flow from variable X. In this example, the information flow analysis module creates a first information flow relation with variable X as the source and variable Y as the target, and a second information flow analysis module with variable X as the source and variable Z as the target. Further in this example, information flow analysis module then determines information flow relations for variable Y, and determines an information flow relation with variable Y as a source and variable Z as a target. Further in this example, the information flow analysis module then determines that there are no additional information flow relations to create for variable Z as a source.

One of skill in the art will appreciate that such implicit and explicit determination of source and target variables for information flow relations may be determined in a number of ways and still be within the scope of the invention. A detailed example in accordance with one or more embodiments of the invention is hereby provided below using application source code in the Java language to demonstrate how application source code written using the Java language might be analyzed using implicit and explicit flows to determine information flow relations.

This example uses an abstract syntax for the Java language as shown below in Table 1, with standard Java language features including class inheritance, dynamic binding, dynamically allocated mutable objects, etc.:

TABLE 1

| Type | Syntax |
| --- | --- |
| Classes c | Class c [extends c] {$\overline{t\,f}$ ; $\overline{M}$ } |
| Methods M | [t] m($\overline{t\,x}$) {s} |
| Statements s | e | x = e | x.f = x | if x then s else s | return x | s ; s |
| Expressions e | v | x | x.f | x.m($\overline{x}$) | x op x |
| Values v | new$^{pc}$ c | true | false | -1 | 0 | 1 | ... |
| Types t | c | bool | int |
| Operators op | & | '|' | + | - | == | ... |

In this example, application source code includes a set of classes, global variables, and a main method. A class may optionally extend another class (optional syntax is identified in [ ]) and have a set of fields and methods. A method has a list of formal parameters, a statement and optionally returns a value.

This example uses three address code form for statements and expressions. The "while" statement is omitted for simplicity, because it is treated in the same way as the "if" statement for the information flow analysis. All statements and expressions may be uniquely labeled and identified by their program counter. In the syntax, the example only labels the new object expression with its program counter, so that the analysis distinguishes different allocation sites of the same new object expression to more precisely reason about aliases (see e.g., [STORE] in Table 2). By convention in most static analyses, variable names (i.e., x, y, or z) are unique, qualified by their scopes. For example, global variables are qualified by class name while local variables are qualified by both class name and method name.

In this example, information flow analysis may be presented formally in the form of inference rules, which are commonly used to define static analysis. Table 2 provides the inference rules in this example for information flows with explicit channels. In Table 2, the first column represents a rule type, the second column represents the abstract format for a line in application source code using the abstract syntax from Table 1, and the third column represents the information flow relation explicitly derived from the application source code line in column 2:

TABLE 2

| Type | Application Source Code/ Starting Information Flow Relation | Resulting Information Flow Relation |
| --- | --- | --- |
| ASSIGN | x=e | e → x |
| STORE | y.f = x<br>new$^{pc}$ c →y<br>new$^{pc}$ c →z | x → z.f |
| CALL-PARAM | x.m($\overline{x}$)<br>new$^{pc}$ c→x<br>class c...{...t m($\overline{t\,y}$) {...}...} | $x_i$ → $y_i$ where i ∈ 1... | $\overline{x}$ | |
| CALL-THIS | x.m($\overline{x}$)<br>new$^{pc}$ c → x<br>class c...{...t m($\overline{t\,y}$) {...}...} | x → c.m.this |
| RETURN | new$^{pc}$ c → x<br>class c...{...t m($\overline{t\,z}$) {...return y...}...} | y → x.m($\overline{x}$) |
| OP-LEFT | x op y | x → x op y |
| OP-RIGHT | x op y | y → x op y |
| TRANSITIVITY | $e_1$ → e<br>e → $e_2$ | $e_1$ → $e_2$ |

In this example, the information flow relations are defined by: $e_1$→$e_2$ where information in expression $e_1$ may flow to expression $e_2$ through explicit channels. In this example, $e_1$ is the source and $e_2$ is the target. For example, in reference to Table 2, one or more embodiments of the invention may see an operation of type [ASSIGN] in application source code containing the instruction "x=e" indicating an assignment from e to x. Such a line results in an information flow relation of e→x, indicating that information flows from source e to target x.

Explicit channels include direct assignments (see [ASSIGN]), field stores (see [STORE]) and method parameter bindings (see [CALL-PARAM] and [CALL-THIS]) and returns (see [RETURN]). In this example, the rule [STORE] considers store/load on aliases (e.g., y and z). In this example, if there is a new object expression at the same allocation site, information may flow to both variables. The rules [CALL-PARAM] and [CALL-THIS] capture interprocedural information flows from actual parameters at call sites to formal parameters at definition sites including the implicit parameter "this." To support class inheritance and dynamic binding, in this example, these rules find out the object creation site (i.e., a points-to analysis) and the possible target method definitions. Similarly, the rule [RE-TURN] finds possible call sites for information flow from a return statement. Note that the information flow analysis in this example is context-insensitive, though context-sensitivity is supported by adding an extra context (a list of call sites) to the information flow relations to track method call/return pairs and ensure their call sites match, effectively precluding infeasible information flow paths.

In this example, the binary operation rules [OP-LEFT] and [OP-RIGHT] state that information may flow from any operand to the result of the binary operation. Note that, because Java is a type-safe language, the operation expressions in this example are only used on number types (e.g., the variables in binary operation "x op y" are not object types, so that object references do not flow through these expressions). The last rule [TRANSITIVITY] defines the transitivity of the information flow relation.

This example then defines a more general information flow relation by: $s_1 \Rightarrow s_2$ where information in statement $s_1$ (e.g., the source) may flow to statement $s_2$ (e.g., the target) through both explicit and implicit channels.

The inference rules presented in Table 3 define an interprocedural information analysis tracking both explicit and implicit flows in an example of one or more embodiments of the invention. In Table 3, the first column represents a rule type, the second column represents the abstract format for a line in application source code and/or an information flow relation using the abstract syntax from Tables 1 and 2, and the third column represents the resulting information flow relation explicitly and/or implicitly derived from the application source code and/or starting information flow relation in column 2:

TABLE 3

| Type | Application Source Code/ Starting Information Flow Relation | Resulting Information Flow Relation |
| --- | --- | --- |
| EXPLICIT | $e_1 \rightarrow e_2$ | $e_1 \Rightarrow e_2$ |
| IF-TRUE | if x then $s_1$ else $s_2$ | $x \Rightarrow s_1$ |
| IF-FALSE | if x then $s_1$ else $s_2$ | $x \Rightarrow s_2$ |
| ASSIGN-IMPLICIT | x=e | $x = e \Rightarrow e$ |
| SEQ-LEFT | $s_1 ; s_2$ | $s_1 ; s_2 \Rightarrow s_1$ |
| SEQ-RIGHT | $s_1 ; s_2$ | $s_1 ; s_2 \Rightarrow s_2$ |
| CALL | new$^{pc}$ c→x class c...{...t m($\overline{t\,y}$) {s}...} | x.m($\overline{x}$) $\Rightarrow$ s |
| RETURN - IMPLICIT | return x | return $x \Rightarrow x$ |
| TRANS-IMPLICIT | $e_1 \Rightarrow e$  $e \Rightarrow e_2$ | $e_1 \Rightarrow e_2$ |

In this example, the rule [EXPLICIT] simply includes all explicit information flow relations, such as those included in Table 2. In the rules [IF-TRUE] and [IF-FALSE], the condition of the if statement may implicitly influence the statements in its branches (i.e. which branch to take depends on the condition). In this example, the rest of the rules propagate the information from a statement to its components, allowing information of the if condition to flow to any statement/expression reachable from its branches. The rules [CALL] and [RETURN-IMPLICIT] support such propagation inter-procedurally. The last rule [TRANS-IMPLICIT] defines the transitivity of the information flow relation.

In the above example, the above rules are applied to one or more portions of application source code to determine a plurality of information flow relations. While a detailed example is included, it should be understood by one of ordinary skill in the art that the information flow analysis module is configured to perform any manner of mapping each potential source of information to each potential target of information inside an information flow relation.

In STEP 208, in one or more embodiments of the invention, the access control analysis module determines the first (or next, if returning from STEP 212) available information flow relation as determined in STEP 206 (i.e., information flow relation i).

In STEP 210, in one or more embodiments of the invention, the access control analysis module determines a confidentiality requirement and a capability for the source variable of the information flow relation as determined in STEP 208. Further, in one or more embodiments of the invention, the access control analysis module determines an integrity requirement and a capability for the target variable of the information flow relation as determined in STEP 208. In one or more embodiments of the invention, a source variable and a target variable may be associated with different classes and therefore have different capability, confidentiality, and integrity requirements.

In one or more embodiments, in STEP 210 the access control analysis module may ignore, skip, or delete one or more information flow relations from the analysis. For example, the access control analysis module may ignore information flow relations as between a source variable and a target variable that have the same capability, confidentiality, and integrity requirements. In one or more embodiments, the access control analysis module may ignore information flow relations wherein the source variable has the lowest confidentiality requirement and the target variable has the lowest integrity requirement. In one or more embodiments, the access control analysis module may ignore information flow relations wherein the target variable has the highest capability and the source variable has the highest capability.

In one or more embodiments, the capability is determined using one or more policy files. For example, with a policy file that contains a mapping for a capability for each class, a capability may be determined for each variable associated with or defined in a class by using the capability associated with each class. In one or more embodiments, the integrity requirement and confidentiality requirement are determined using one or more specification files. For example, with a specification file that contains a mapping for an integrity requirement and confidentiality requirement for each method, an integrity requirement and confidentiality requirement may be determined for each variable associated with or defined in a method by using the integrity requirement and confidentiality requirement associated with each method.

In STEP 212, in one or more embodiments, the access control analysis module determines if there are additional information flow relations as determined in STEP 206. If the determination is affirmative, the access control analysis module proceeds to STEP 208, and determines the next available information flow relation for analysis. If the determination is negative, the access control analysis module proceeds to STEP 214 in FIG. 2B.

In STEP 214, in one or more embodiments of the invention, the access control analysis module again iterates through the information flow relations by determining the first (or next, if returning from STEP 222) information flow relation (i.e., information flow relation p).

In STEP 216, in one or more embodiments of the invention, for the information flow relation as determined in STEP 214, the access control analysis module compares the confidentiality requirement for the source variable to the capability for the target variable. If the confidentiality requirement for the source variable is less than or equal to the capability for the target variable, the access control analysis module proceeds to STEP 218. If the confidentiality requirement for the source variable is not less than or equal to the capability for the target variable, the access control analysis module proceeds to STEP 220.

In STEP 218, in one or more embodiments of the invention, for the information flow relation as determined in STEP 214, the access control analysis module compares the integrity requirement for the target variable to the capability for the source variable. If the integrity requirement for the target variable is less than or equal to the capability for the source variable, the access control analysis module proceeds to STEP 222. If the integrity requirement for the target variable is not less than or equal to the capability for the source variable, the access control analysis module proceeds to STEP 220.

In this way, in one or more embodiments of the invention, a program is free of security bugs, if for any two statements in the program, if one may influence another via either explicit or implicit flows then the former must meet the integral requirement of the latter to send the information and the latter must meet the confidential requirement of the former to receive the information. For example, wherein the capability of a target variable is not greater than and not equal to the confidentiality requirement of a source variable or the capability of a source variable is not greater than and not equal to the integrity requirement of a target variable, an error report log entry may be generated indicating that the source variable and target variable correspond to a security bug.

In STEP 220, in one or more embodiments of the invention, the access control analysis module generates an error report log entry for the information flow relation as determined in STEP 214. In one or more embodiments, an error report log entry is one or more data structures that include a descriptive listing for each information flow relation that fails the determination as performed by the access control analysis module in STEP 216 and 218. In one or more embodiments, each error report log entry is human readable. For example, an error report log entry may indicate a source variable, a line number, class, and file where the source variable may be found, a target variable, and a line number, class, and file where the target variable may be found. In one or more alternative embodiments, each error report log entry is machine readable, such that a process or group of processes may modify the application source code using the error report log entry.

In STEP 222, in one or more embodiments, the access control analysis module determines if there are additional information flow relations as determined in STEP 206. If the determination is affirmative, the access control analysis module proceeds to STEP 214, and determines the next available information flow relation. If the determination is negative, the access control analysis module proceeds to STEP 224.

In STEP 224, in one or more embodiments of the invention, the access control analysis module generates an error report log using any error report log entries generated in each iteration through STEP 220. For example, the access control analysis module may aggregate all error report log entries. In another example, the access control analysis module may generate machine readable instructions to highlight and/or modify the application source code. In one or more embodiments, the access control analysis module may output the error report log. For example, the access control analysis module may output the error report log via an output device connected to the compiler or the computer processor. In another embodiment, the access control analysis module may store the error report log file. For example, the access control analysis module may store one or more error report log files in the data repository.

In optional STEP 226, in one or more embodiments of the invention, the compiler compiles the application source code into compiled application source code based on the error report log. In one or more embodiments, compiling the application source code is based on a determination that no error report log entries are generated. For example, if the error report log as generated in STEP 224 is empty or otherwise indicative of no errors, the compiler compiles the application source code. For example, the compiler may compile the application source code into java bytecode. In another embodiment, if the error report log as generated in STEP 224 is not empty, the compiler compiles the application source code with one or more errors.

In optional STEP 228, in one or more embodiments of the invention, the compiler modifies the application source code into modified application source code based on the error report log. In one example, the compiler removes one or more methods from the application source code for which information flow relations associated with that method have generated entries in the error report log. For example, a call to a method in a class with a low capability from a method in a class with a higher integrity requirement may be rewritten or removed. In one or more embodiments, the static program analysis system may prompt a user via an output device to modify the application source code in conjunction with presenting the error report log file to the user via an output device. In this way, the application source code may be improved, and potential security issues may be removed from the application source code as it is modified into modified application source code.

In optional STEP 230, in one or more embodiments of the invention, the compiler compiles the modified application source code into compiled modified application source code.

While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 shows an example of application source code in accordance with one or more embodiments of the invention. The following example is for explanatory purposes only and not intended to limit the scope of the invention.

In the example, the application source code includes one or more classes (e.g., class A (302A), class B (302B), and class C (302C)). Each class (e.g., class A (302A), class B (302B), and class C (302C)) includes a security parameters object (e.g., security parameters A (304A), security parameters B (304B), and security parameters C (304C)).

In this example, each security parameters object (e.g., security parameters A (304A), security parameters B (304B), and security parameters C (304C)) is a data structure including fields for storing the capability, integrity requirement, and confidentiality requirement associated with each class (e.g., class A (302A), class B (302B), and class C (302C)) and each method within each class. In one or more embodiments, the security parameters object (e.g., security parameters A (304A), security parameters B (304B), and security parameters C (304C)) is included in each instantiation of each class. For example, each object of class A (302A) that is created has a security parameters A (304A) variable. In another embodiment, each security parameters object (e.g., security parameters A (304A), security parameters B (304B), and security parameters C (304C)) is a global variable created during static program analysis. For example, upon analysis of the application source code associated with the classes (e.g., class A (302A), class B (302B), and class C (302C)), the information flow analysis module and/or the access control analysis module creates a security parameters object (e.g., security parameters A (304A), security parameters B (304B), and security parameters C (304C)) for each class (e.g., class A (302A), class B (302B), and class C (302C)) and sets the values contained therein using the policy files and the specification files.

In this example, each class (e.g., class A (302A), class B (302B), and class C (302C)) contains one or more methods, Class A (302A) includes method A.main (306), method A.m1 (308), and method A.m2 (310). Class B (302B) includes method B.getFileName (328) and variable B.filename (318). Class C (302C) includes method C.getFileName (330) and variable C.filename (324). Each method may include one or more local variables. In this example, method A.m1 (308) includes variables A.m1.b (314) and A.m1.f (316). Further in this example, method A.m2 (310) includes variables A.m2.b (320), A.m2.f (322), and A.m2.c (326). Further, method A.main (306) includes variable A.main.a (312). Further, in this example, method B.getFileName (328) includes variable B.filename (318) and method C.getFileName (330) includes variable C.filename (324).

In this example, capabilities, integrity requirements, and confidentiality requirements are expressed in terms of an integer between 0 and 2, with 0 being the lowest and 2 being the highest. Further in this example, each security parameters object (e.g., security parameters A (304A), security parameters B (304B), and security parameters C (304C)) includes the capability, integrity requirement, and confidentiality requirement for each class and each method within each class. In this example, class A (302A) and class B (302B) are relatively trusted, and as a result have both access to sensitive system resources (e.g., a high capability) and restrictions on which classes send and receive information to and from them (e.g., high integrity requirement and confidentiality requirement, respectively, for the methods in class A (302A) and class B (302B)). In this example, both security parameters A (304A) and security parameters B (304B) include a capability of 2. Each method within class A (302A) (e.g., A.main (306), A.m1 (308), and A.m2 (310)) and within class B (302B) (e.g., B.getFileName (328)) includes an integrity requirement of 2 and a confidentiality requirement of 2. In contrast, in this example, class C (302C) is relatively untrusted, and as a result does not have access to sensitive system resources (e.g., a low capability) but no restrictions on which classes send and receive information to and from class C (302C) (e.g., low integrity requirement and confidentiality requirement, respectively, for the methods in class C (302C)). As a result, in this example, security parameters C (304C) includes a capability of 0. Each method within class C (304C) (e.g., C.getFileName (330)) includes an integrity requirement of 0 and a confidentiality requirement of 0.

In this example, class A (302A) includes three methods—A.main (306), A.m1 (308), and A.m2 (310). Method A.main (312) creates an instance of class A (302A), and assigns it to variable A.main.a (312). Method A.main (312) then calls A.m1 (308) and A.m2 (310) on A.main.a (312).

Method A.m1 (308) creates a new instance of class B (302B), and assigns the new instance to variable A.m1.b (314). Method A.m1 (308) then calls method B.getFileName (328) on variable A.m1.b (314) and assign the result to variable A.m1.f (316). Method B.getFileName (328) simply returns variable B.filename (318).

In this example, the information flow analysis module receives the application source code for class A (302A) and class B (302B). The information flow analysis module determines a plurality of variables using the application source code, which in this example include A.main.a (312), A.m1.b (314), A.m1.f (316), and B.filename (318).

In one or more embodiments, the information flow analysis module then determines a plurality of information flow relations. In this example, the information flow analysis module determines information flow relations by iterating through each variable as a potential source variable and using explicit and implicit flow analysis to determine which target variables may receive information from each source variable. In this example, the information flow analysis module determines information flow relations as (source, target) pairs including, among others, (B.filename (318), A.m1.f (316)), (B.filename (318), A.main.a (312)), and (A.m1.f (316), A.main.a (312)).

In one or more embodiments, the access control analysis module determines and confidentiality requirement and a capability for each of the source variables. In this example, the access control analysis module determines a confidentiality requirement of 2 and a capability of 2 for B.filename (318) and A.m1.f (316). In one or more embodiments, the access control analysis module determines the confidentiality and capability of B.filename (318) using security parameters B (304B) and the confidentiality and capability of A.m1.f (316) using security parameters A (304A). In one or more alternative embodiments, the access control analysis module determines the confidentiality requirement and capability of B.filename (318) and A.m1.f (316) using one or more policy files and specification files.

In one or more embodiments, the access control analysis module determines an integrity requirement and a capability for each target variable. In this example, the access control analysis module determines an integrity requirement of 2 and a capability of 2 for A.m1.f (316) and A.main.a (312). In one or more embodiments, the access control analysis module determines the integrity requirement and capability of A.m1.f (316) and A.main.a (312) using security parameters A (304A). In one or more alternative embodiments, the access control analysis module determines the integrity requirement and capability of A.m1.f (316) and A.main.a (312) using one or more policy files and specification files.

In this example, the access control analysis module compares each information flow relation to generate an error report log entry in any case where the capability of the target variable is not greater than and not equal to the confidentiality requirement of the source variable or the capability of the source variable is not greater than and not equal to the integrity requirement of the target variable.

In this example, for the first information flow relation of (B.filename (318), A.m1.f (316)), the access control analysis module does not generate an error report log entry as the capability of the target variable (e.g., 2) is equal to the confidentiality requirement of the source variable (e.g., 2) and the capability of the source variable (e.g., 2) is equal to the integrity requirement of the target variable (e.g., 2).

In this example, for the second information flow relation (B.filename (318), A.main.a (312)), the access control analysis module does not generate an error report log entry as the capability of the target variable (e.g., 2) is equal to the confidentiality requirement of the source variable (e.g., 2) and the capability of the source variable (e.g., 2) is equal to the integrity requirement of the target variable (e.g., 2).

In this example, for the third information flow relation (A.m1.f (316), A.main.a (312)), the access control analysis module does not generate an error report log entry as the capability of the target variable (e.g., 2) is equal to the confidentiality requirement of the source variable (e.g., 2) and the capability of the source variable (e.g., 2) is equal to the integrity requirement of the target variable (e.g., 2).

In one or more embodiments, the compiler compiles the application source code into compiled application source code based on the error report log, which in this example has no error report log entries.

In a second example, assume that the application source code includes method A.m2 (310), which includes variables A.m2.b (320), A.m2.f (322), and A.m2.c (326). Method A.m2 (310) creates a new instance of class B (302B), and assigns the new instance to variable A.m2.b (320). Method A.m2 (310) also creates a new instance of class C (302C), and assigns the new instance to variable A.m2.c (326). Method A.m2 (310) includes conditional logic—if a condition is true, A.m2 (310) then calls method B.getFileName (328) on variable A.m2.b (320) and assign the result to variable A.m2.f (320). In this example, if the condition is false, A.m2 (310) then calls method C.getFileName (330) on variable A.m2.c (326) and assign the result to variable A.m2.f (320). Method C.getFileName (330) simply returns variable C.filename (324).

In this example, the information flow analysis module receives the application source code for class A (302A), class B (302B), and class C (302C). The information flow analysis module determines a plurality of variables using the application source code, which in this example include A.main.a (312), A.m2.b (320), A.m2.f (322), B.filename (318), and C.filename (324).

In this example, the information flow analysis module determines information flow relations including among others, (B.filename (318), A.m2.f (322)), (B.filename (318), A.main.a (312)), (A.m2.f (320), A.main.a (312)), (C.filename (324), A.m2.f (322)), and (C.filename (324), A.main.a (312)). In one or more embodiments, the information flow analysis module determines the information flow relations using both implicit and explicit flow relations. In this example, given the conditional logic and that the information may flow from either C.filename (324) or B.filename (318), each is included in the information flow relations.

In one or more embodiments, the access control analysis module determines and confidentiality requirement and a capability for each of the source variables. In this example, the access control analysis module determines a confidentiality requirement of 2 and a capability of 2 for B.filename (318) and A.m2.f (322), but a confidentiality requirement of 0 and a capability of 0 for C.filename (324). In one or more embodiments, the access control analysis module determines the confidentiality and capability of B.filename (318) using security parameters B (304B), for C.filename (324) using security parameters C (304C), and A.m2.f (322) using security parameters A (304A). In one or more alternative embodiments, the access control analysis module determines the confidentiality requirement and capability of B.filename (318), C.filename (324), and A.m2.f (322) using one or more policy files and specification files.

In one or more embodiments, the access control analysis module determines an integrity requirement and a capability for each target variable. In this example, the access control analysis module determines an integrity requirement of 2 and a capability of 2 for A.m2.f (322) and A.main.a (312).

In this example, the access control analysis module compares each information flow relation to generate an error report log entry in any case where the capability of the target variable is not greater than and not equal to the confidentiality requirement of the source variable or the capability of the source variable is not greater than and not equal to the integrity requirement of the target variable.

In this example, the above discussion corresponding to the information flow relations present in the first example applies. For the fourth information flow relation of (C.filename (318), A.m2.f (322)), the access control analysis module generates an error report log entry as the integrity requirement of the target variable (e.g., 2) is greater than the capability of the source variable (e.g., 0). Similarly, for the fifth information flow relation of (C.filename (318), A.main.a (312)), the access control analysis module generates an error report log entry as the integrity requirement of the target variable (e.g., 2) is greater than the capability of the source variable (e.g., 0).

In this example, the error report log entries are due in part to the relatively untrusted class C (302C) having the ability to pass information into the relatively trusted class A (302A). Should a piece of malicious or poorly designed code place a dangerous value in C.filename (324), the dangerous value could flow to A.m2.f (322) and A.main.a (312). Since the access barriers to interact (i.e., confidentiality requirement and integrity requirement) with class C (302C) are lower as its purported capabilities (i.e., capability) are lower, it is easier for malicious or poorly designed code to influence, and that influence may flow to the more security-sensitive class A (302A). The error report log entries generated in this example may serve to flag such danger to a user, such that the user may alter or improve the application source code to address such danger.

In this example, the application source code may be modified into modified application source code based on the error report log. For example, the conditional branch to call C.getFileName (330) may be removed. In one or more embodiments, the compiler may remove the conditional branch. In an alternative embodiment, the error report log may be presented to a user through an output device, and a user may modify the application source code into modified application source code. In this example, the modified application source code is then compiled into compiled modified source code. In this way, in this example, application source code and resulting compiled application source code are improved by removal of potential security breaches in information flow from relatively insecure class C (302C) to relatively secure class A (302A).

Figure 4:
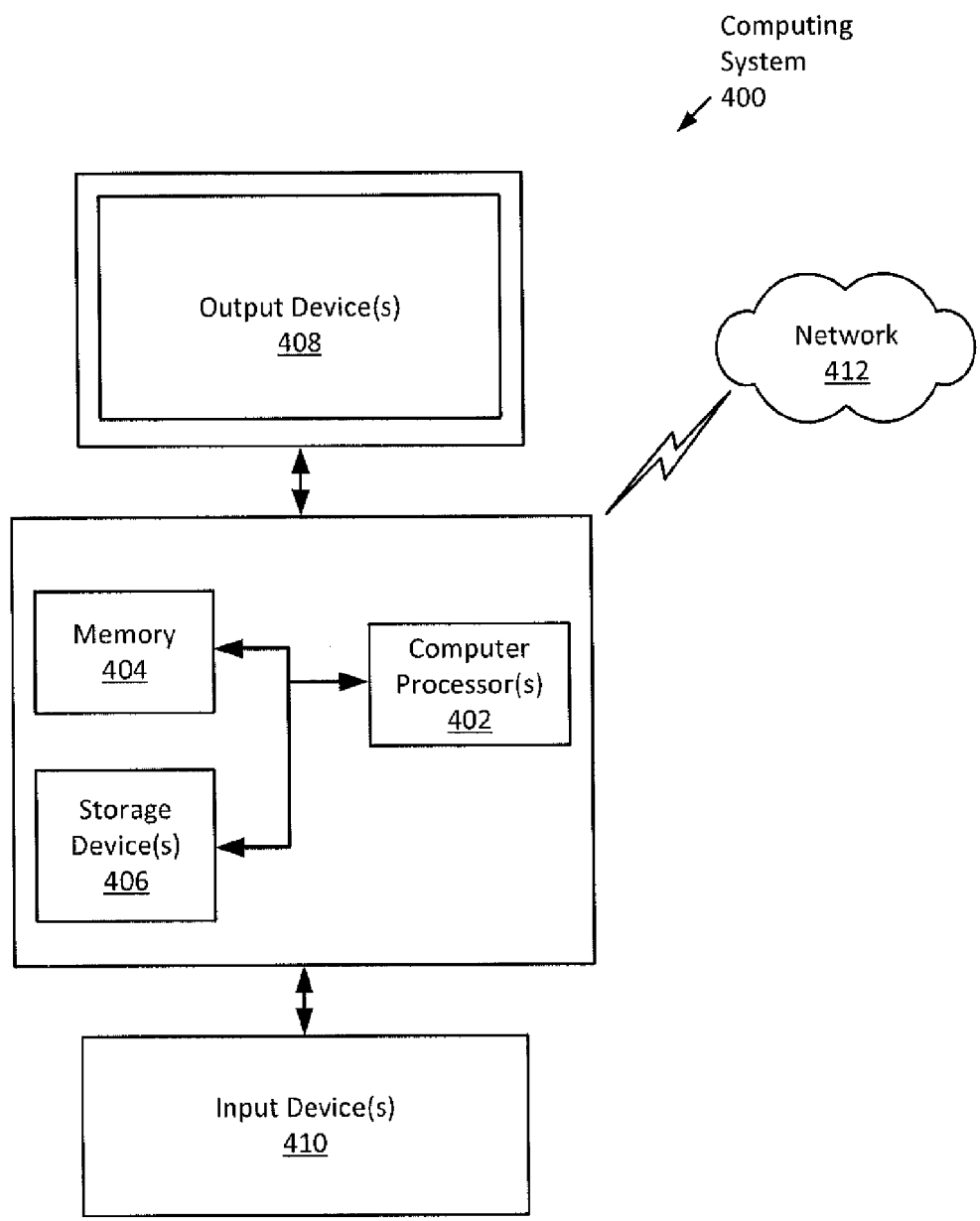

While FIGS. 1, 3, and 4 show a configuration of components, other configurations may be used without departing from the scope of the invention. For example, various components may be combined to create a single component.

As another example, the functionality performed by a single component may be performed by two or more components.

Embodiments of the invention may be implemented on a computing system. Any combination of mobile, desktop, server, embedded, or other types of hardware may be used. For example, as shown in FIG. 5, the computing system (400) may include one or more computer processor(s) (402), associated memory (404) (e.g., random access memory (RAM), cache memory, flash memory, etc.), one or more storage device(s) (406) (e.g., a hard disk, an optical drive such as a compact disk (CD) drive or digital versatile disk (DVD) drive, a flash memory stick, etc.), and numerous other elements and functionalities. The computer processor(s) (402) may be an integrated circuit for processing instructions. For example, the computer processor(s) may be one or more cores, or micro-cores of a processor. The computing system (400) may also include one or more input device(s) (410), such as a touchscreen, keyboard, mouse, microphone, touchpad, electronic pen, or any other type of input device. Further, the computing system (400) may include one or more output device(s) (408), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (400) may be connected to a network (414) (e.g., a local area network (LAN), a wide area network (WAN) such as the Internet, mobile network, or any other type of network) via a network interface connection (not shown). The input and output device(s) may be locally or remotely (e.g., via the network (412)) connected to the computer processor(s) (402), memory (404), and storage device(s) (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (400) may be located at a remote location and connected to the other elements over a network (414). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for using static program analysis for detecting security bugs in application source code comprising:
    receiving, by a compiler, the application source code;
    performing, by the compiler, static program analysis by:
        determining a plurality of programming language variables based on the application source code;
        determining, using the plurality of programming language variables, a plurality of information flow relations, the plurality of information flow relations each comprising a source variable and a target variable;
        determining a confidentiality requirement and a capability for the source variable of each of the plurality of information flow relations, wherein the capability of the source variable expresses a permission that a portion of the application source code has with respect to accessing a first sensitive resource of a computer system;
        determining, by at least one computer processor, an integrity requirement and a capability for the target variable of each of the plurality of information flow relations, wherein the capability of the target variable expresses a permission that a portion of the application source code has with respect to accessing a second sensitive resource of the computer system; and
        determining, by the at least one computer processor, whether the application source code comprises a security bug by checking whether, for each information flow relation of the plurality of information flow relations:
            the capability of the target variable is not less than the confidentiality requirement of the source variable, and
            the capability of the source variable is not less than the integrity requirement of the target variable; and
    generating an error report log when the application source code is determined to comprise a security bug.

2. The method of claim 1, further comprising:
    generating an error report log entry for each information flow relation of the plurality of information flow relations when the capability of the target variable is less than the confidentiality requirement of the source variable or when the capability of the source variable is less than the integrity requirement of the target variable, wherein the error report log is generated using the error report log entry; and
    compiling the application source code into compiled application source code based on a determination that no error report log entries are generated.

3. The method of claim 2, further comprising:
    modifying the application source code into modified application source code based on the error report log; and
    compiling the modified application source code into compiled modified application source code.

4. The method of claim 1, further comprising outputting the error report log.

5. The method of claim 1, wherein the capability is determined using a policy file and the integrity requirement and confidentiality requirement are determined using a specification file.

6. The method of claim 1, wherein the plurality of information flow relations is determined using implicit flows and explicit flows.

7. A system for using static program analysis for detecting security bugs in application source code comprising:
at least one computer processor;
a non-transitory computer readable medium comprising instructions for a compiler, that when executed on the at least one computer processor, cause the at least one computer processor to:
receive the application source code,
determine a plurality of programming language variables using the application source code, and
determine, using the plurality of programming language variables, a plurality of information flow relations, the plurality of information flow relations each comprising a source variable and a target variable;
determine a confidentiality requirement and a capability for the source variable of each of the plurality of information flow relations, wherein the capability of the source variable expresses a permission that a portion of the application source code has with respect to accessing a first sensitive resource of the system,
determine, by the at least one computer processor, an integrity requirement and a capability for the target variable of each of the plurality of information flow relations, wherein the capability of the source variable expresses a permission that a portion of the application source code has with respect to accessing a second sensitive resource of the system,
determine, by the at least one computer processor, whether the application source code comprises a security bug by checking whether, for each information flow relation of the plurality of information flow relations:
the capability of the target variable is not less than the confidentiality requirement of the source variable, and
the capability of the source variable is not less than the integrity requirement of the target variable, and
generate an error report log when the application source code is determined to comprise a security bug; and
a data repository storing the application source code, a plurality of policy files, and a plurality of specification files.

8. The system of claim 7, wherein the instructions further cause the at least one computer processor to:
generate an error report log entry for each information flow relation of the plurality of information flow relations when the capability of the target variable is less than the confidentiality requirement of the source variable or when the capability of the source variable is less than the integrity requirement of the target variable, wherein the error report log is generated using the error report log entry; and
compile the application source code into compiled application source code based on a determination that no error report log entries are generated.

9. The system of claim 8, wherein the instructions further cause the at least one computer processor to:
modify the application source code into modified application source code based on the error report log; and
compile the modified application source code into compiled modified application source code.

10. The system of claim 7, further comprising an output device configured to display the error report log.

11. The system of claim 7, wherein the instructions further cause the at least one computer processor to determine the capability using one or more of the plurality of policy files and the integrity requirement and confidentiality requirement using one or more of the plurality of specification files.

12. The system of claim 7, wherein the instructions further cause the at least one computer processor to determine the plurality of information flow relations using explicit flows and implicit flows.

13. The system of claim 7, wherein the at least one computer processor is further configured to store the error report log file in the data repository.

14. The system of claim 7, wherein the instructions further cause the at least one computer processor to determine a plurality of programming language variables using the application source code.

15. A non-transitory computer readable medium comprising computer readable program code embodied therein for causing a computer system to perform a method for using static program analysis for detecting security bugs in application source code, the method comprising:
receiving, by a compiler, the application source code;
performing, by the compiler, static program analysis by:
determining a plurality of programming language variables based on the application source code;
determining, using the plurality of programming language variables, a plurality of information flow relations, the plurality of information flow relations each comprising a source variable and a target variable;
determining a confidentiality requirement and a capability for the source variable of each of the plurality of information flow relations, wherein the capability of the source variable expresses a permission that a portion of the application source code has with respect to accessing a first sensitive resource of the computer system;
determining, by at least one computer processor, an integrity requirement and a capability for the target variable of each of the plurality of information flow relations, wherein the capability of the target variable expresses a permission that a portion of the application source code has with respect to accessing a second sensitive resource of the computer system; and
determining, by the at least one computer processor, whether the application source code comprises a security bug by checking whether, for each information flow relation of the plurality of information flow relations:
the capability of the target variable is not less than the confidentiality requirement of the source variable, and
the capability of the source variable is not less than the integrity requirement of the target variable; and
generating an error report log when the application source code is determined to comprise a security bug.

16. The computer readable medium of claim 15, the method further comprising:
generating an error report log entry for each information flow relation of the plurality of information flow relations when the capability of the target variable is less than the confidentiality requirement of the source variable or when the capability of the source variable is less than the integrity requirement of the target variable, wherein the error report log is generated using the error report log entry; and compiling the application source code into compiled application source code based on a determination that no error report log entries are generated.

17. The computer readable medium of claim 16, wherein the method further comprises:

modifying the application source code into modified application source code based on the error report log; and compiling the modified application source code into compiled modified application source code.

18. The computer readable medium of claim 15, wherein the method further comprises outputting the error report log.

19. The computer readable medium of claim 15, wherein the capability is determined using a policy file and the integrity requirement and confidentiality requirement are determined using a specification file.

20. The computer readable medium of claim 15, wherein the plurality of information flow relations is determined using implicit flows and explicit flows.

* * * * *